US006550241B2

(12) United States Patent
Ostini

(10) Patent No.: US 6,550,241 B2
(45) Date of Patent: Apr. 22, 2003

(54) FLUID-OPERATED CIRCUIT FOR SETTING THE TOP AND BOTTOM DEAD CENTER LOCATION OF THE PUNCH ACTUATION CYLINDER IN PUNCHING MACHINES

(75) Inventor: Giorgio Ostini, Grono (CH)

(73) Assignee: Euromac S.r.l., Formigine (IT)

( * ) Notice: Subject to any disclaimer, the term of this patent is extended or adjusted under 35 U.S.C. 154(b) by 0 days.

(21) Appl. No.: 09/811,408

(22) Filed: Mar. 19, 2001

(65) Prior Publication Data

US 2001/0025487 A1 Oct. 4, 2001

(30) Foreign Application Priority Data

Mar. 30, 2000 (GB) ............................................ 0007800

(51) Int. Cl.[7] ................................................ F16D 31/02
(52) U.S. Cl. .............................. 60/433; 60/486; 91/410
(58) Field of Search .......................... 60/486, 429, 433, 60/430; 91/245, 410, 392; 92/60.5; 100/269.14

(56) References Cited

U.S. PATENT DOCUMENTS 5,135,030 A * 8/1992 Schoen .................. 137/625.63
5,460,084 A 10/1995 Otremba et al.
5,868,555 A 2/1999 Shimotomai

FOREIGN PATENT DOCUMENTS

GB 2 301 460 5/1996
RU 779658 B * 11/1980

* cited by examiner

*Primary Examiner*—Edward K. Look
*Assistant Examiner*—Thomas E. Lazo
(74) *Attorney, Agent, or Firm*—Herbert Dubno

(57) ABSTRACT

A fluid-operated circuit for setting the top dead center and the bottom dead center of the punch actuation cylinder in punching machines comprises a first copying distributor which distributes pressurized fluid, which has a spool at one end and can be connected in output to the upper section of the chamber in which the actuation cylinder slides and in input to a first pump for feeding low-pressure fluid and to at least one first fast-acting electric valve element; the spool can be pushed into position by contact by a corresponding setting element with continuous micrometric movement.

12 Claims, 7 Drawing Sheets

FLUID-OPERATED CIRCUIT FOR SETTING THE TOP AND BOTTOM DEAD CENTER LOCATION OF THE PUNCH ACTUATION CYLINDER IN PUNCHING MACHINES

CROSS-REFERENCE TO RELATED APPLICATIONS

This application claims priority to Great Britain Application UK No. 0007800.6 of Mar. 30, 2000, the disclosure of which is incorporated herein by reference.

BACKGROUND OF THE INVENTION

The present invention relates to a fluid-operated circuit for setting the top dead center and the bottom dead center location of the punch actuation cylinder in punching machines.

Punching machines use different technologies in order to preset the useful strokes of the punch actuation cylinders and accordingly to preset the top dead center (TDC) from which the stroke begins and the bottom dead center (BDC) where the active step of the stroke stops.

Control of the TDC is performed by means of an electric-hydraulic copying distributor which is driven by a fast driver which performs a stroke inside a chamber of its own, under the action of magnetic fields generated by at least one pair of coils which can be excited electrically with intensities varying according to the requirements. The distributor moves in the chamber in contrast with springs arranged at the ends, and drives, thanks to these movements, the opening and closure of the feed and discharge ports of the hydraulic circuit that physically actuates the cylinder of the punching machine.

A first mechanical embodiment for determining the level of the TDC from which the cylinder begins its active stroke and of the BDC comprise mechanical stop elements, in practice axially adjustable pins, on the punching cylinder, or more specifically on a support rigidly associated therewith. Such pins are adapted to abut respectively against a corresponding lower abutment, which is fitted in a fixed position, and the spool of the copying distributor, sliding in the opposite direction with respect to the active and return strokes of the cylinder, and said stop element determines the final stop of its descent stroke (BDC), while abutment against the spool stops the ascent stroke (TDC).

Both pins have manual adjustment, so that they can be arranged micrometrically, as required, accordingly changing the extent of the active stroke.

Another technical embodiment of a digital kind consists in introducing electronic stop elements in the logic controller that controls the movement of the copying distributor; when the dead centers are reached, the stroke of the distributor, and accordingly the active and return strokes of the cylinder, stop.

In both cases, the prior art suffers from drawbacks.

A first drawback linked to the solution with a mechanical stop element is the fact that control of the stroke of the distributor occurs only by acting manually on the adjustments of the stop pins, and evidently causing a waste of time in order to complete the intervention every time it is required.

A second drawback, linked instead to the application of digital stop elements, is the fact that their position cannot be adjusted continuously but can only be adjusted by segments of modular levels which can be gradually added or subtracted. Essentially, it is not possible to perform linear interpolation of the segmented values and accordingly the stroke of the distributor and therefore of the cylinder can only be adjusted and stopped at each individual end of the modular segments and not, if required, between the ends of at least one segment.

Moreover, it is also necessary to be able to control the speed of the stroke of the cylinder. Indeed the control is very important if not indispensable in particular types of application of punching machines, such as for example the provision of a thread in a metal plate.

Finally, when mechanical resistance to full or partial penetration of the metal plate by the punch is high, it is essential to have an increase in the active force of the cylinder available.

SUMMARY OF THE INVENTION

The aim of the present invention is to solve the above-mentioned problems of the prior art by providing a fluid-operated circuit for setting the top dead center and the bottom dead center of the punch actuation cylinder in punching machines, and which has none of the drawbacks of the known devices.

This aim and other objects are achieved by a fluid-operated circuit for setting the top dead center and the bottom dead center location of the punch actuation cylinder in punching machines, comprising a first copying means which distributes pressurized fluid, which has a spool at one end and can be connected in output to the upper section of the chamber in which the plunger of the actuation cylinder slides and in input to a first pumping means for feeding low-pressure fluid and to at least one first fast-acting electric valve means, characterized in that said spool is locatable by contact pushing by way of a corresponding means with continuous micrometric movement.

BRIEF DESCRIPTION OF THE DRAWINGS

Further characteristics and advantages of the present invention will become apparent from the description of a preferred embodiment of a fluid-operated circuit for setting the top dead center and the bottom dead center of the punch actuation cylinder in punching machines, illustrated only by way of non-limitative example in the accompanying drawings, wherein.

DESCRIPTION OF THE PREFERRED EMBODIMENTS

With reference to the above figures, 1 designates a cylinder for actuating the punch in a punching machine, having a plunger which slides inside a chamber 2 which it divides into two portions: an upper one 2*a* and a lower one 2*b*.

Figure 6B:
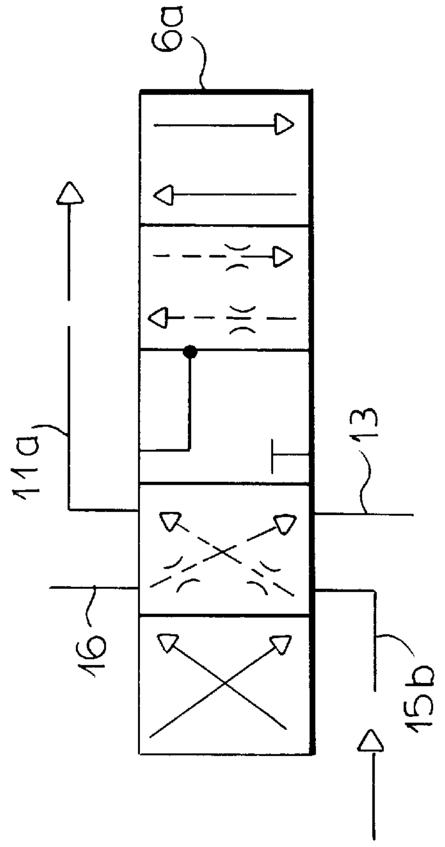
FIGS. 6*a* and 6*b* are views of an electric valve means of the modulating type in two operating configurations.
Figure 6A:
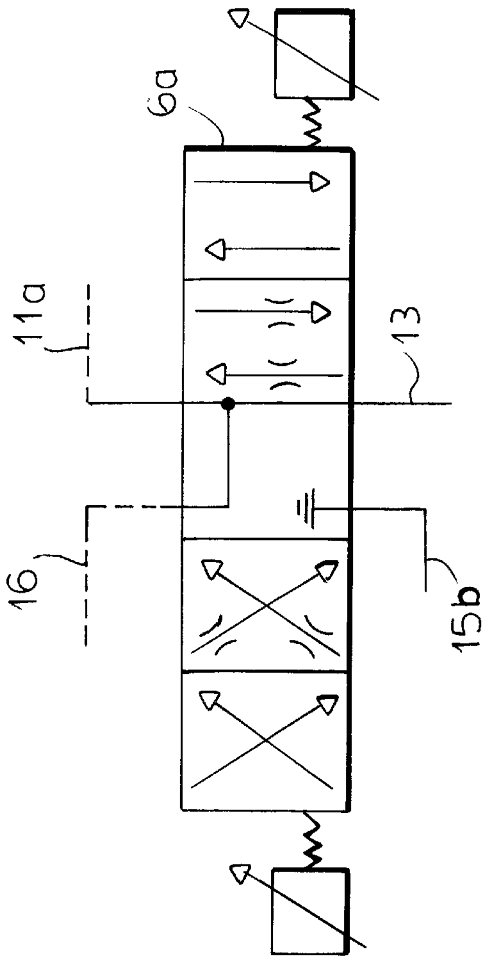

The cylinder 1 rigidly supports at an end of its plunger, for example on a beam 1*a* rigidly coupled thereto, a second chamber 3 inside which a setting plunger 4 is fitted so as to slide; the setting plunger protrudes upwards. The cylinder 1 is driven, for actuation of its plunger, by a first distributor means 5, known technically as “copying distributor”, which has three intervention positions and is in turn controlled by an electric valve means 6: this means can be of the on-off type, i.e. also of the type with three intervention positions, or can be of the proportional type with five intervention positions (see FIG. 6*a*).

The entire fluid-operated circuit, generally designated by 7, that carries the pressurized fluid, oil in the specific case, is supplied by a first pumping means 8 which feeds oil at low pressure, on the average approximately at an exemplifying value of 60 bar, and by a second and parallel pumping means 9 which supplies, if required, oil at high pressure, on the average approximately at an exemplifying value of 210 bar.

A second distributor means 10 is interposed between the two pumping means 8 and 9, on the circuit 10*a* that connects them in parallel, is adapted to control the connection if required, and can be activated by means of a signal which arrives from the portion 2*a* of the chamber 2 through a sensing branch 10*b*.

The second chamber 3 is supplied by means of a branch 11 of the circuit 7 which is controlled by a second flow control valve means 12 which has two positions (open or closed) and is in turn connected, by means of a branch 11*a*, to said electric valve means 6, to which a branch 13 is also connected which leads to a discharge 14.

The first pumping means 8 is always connected in output to the lower portion 2*b* of the chamber 2 through a branch 15, and the cylinder 1 is therefore constantly subjected to a pressure which tends to keep its plunger raised at the TDC (top dead center).

The first copying distributor means 5 is provided, in a downward region, with an extension spool 5*a* which is adapted to maintain direct contact with the setting plunger 4 and is also subjected, at one end, to the constant low supply pressure provided by the branch 15 with the offtake 15*a*; at the opposite end, it is connected to the electric valve means 6 by means of a is branch 16.

Opposite thereto there is an additional branch 15*b* which branches off from the branch 15 that arrives from the first pumping means 8 and also reaches the first copying distributor means 5.

An additional branch 17 is also arranged parallel to said branch 15*b* and is directed towards said means 5, and arrives directly from the second pumping means 9 and leads into it.

The first copying distributor means 5 is also connected to a discharge 18 by virtue of a circuit branch 19.

A reader means 20 is also rigidly associated with the plunger of the cylinder 1 and is adapted to monitor the levels and the reaching of the BDC.

The second pumping means 9 is controlled by means of the overpressure safety valve means 21.

Optionally, in particular uses of the punching machine (so-called “scribing”), an eccentric means 23 is fitted between the plunger 4 and the spool 5*a* of the copying distributor 5.

The operation of the invention is described hereinafter without detailed reference to the constructive particularities of said first copying distributor means 5, said second copying distributor means 10, the electric valve means 6 or 6*a* and the second flow control valve means 12, since they are known to the average technician in the field and so are the first pumping means 8 and the second pumping means 9.

Figure 1:
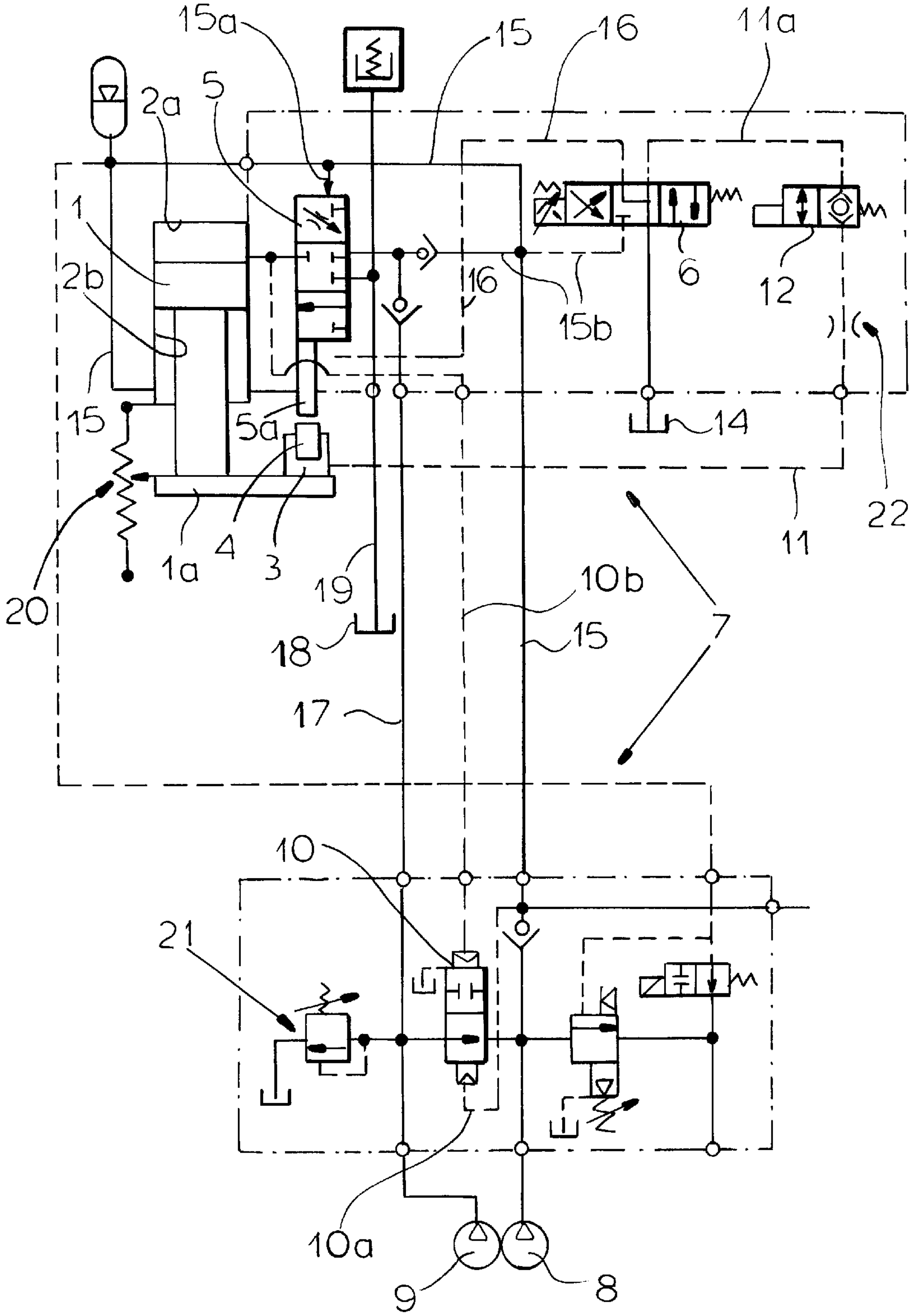
FIG. 1 is a diagram of the circuit according to the invention in a stage in which the cylinder lies at a previously determined TDC.

Operation is as follows: with reference to FIG. 1, it can be noted that the plunger of the cylinder 1 lies at its TDC (top dead center), which is determined by the arrangement of the setting plunger 4 on which the spool 5*a* of the first copying distributor 5 rests.

The second chamber 3 is not supplied, since the second valve means 12 is in the closed configuration.

The low feed pressure arrives from the first pumping means 8 and, through the branch 15 and the offtake 15*a*, acts both in the lower portion 2*b* of the chamber 2 and on the upper section of the spool 5*a*, while the lower section is connected to the discharge 14 through the branches 16 and 13.

The reader means 20 can be preset in the electronic logic controller of the punching machine to a BDC value, and in practice in this configuration the extent of the useful stroke that the plunger of the cylinder 1 can perform is determined.

Figure 2:
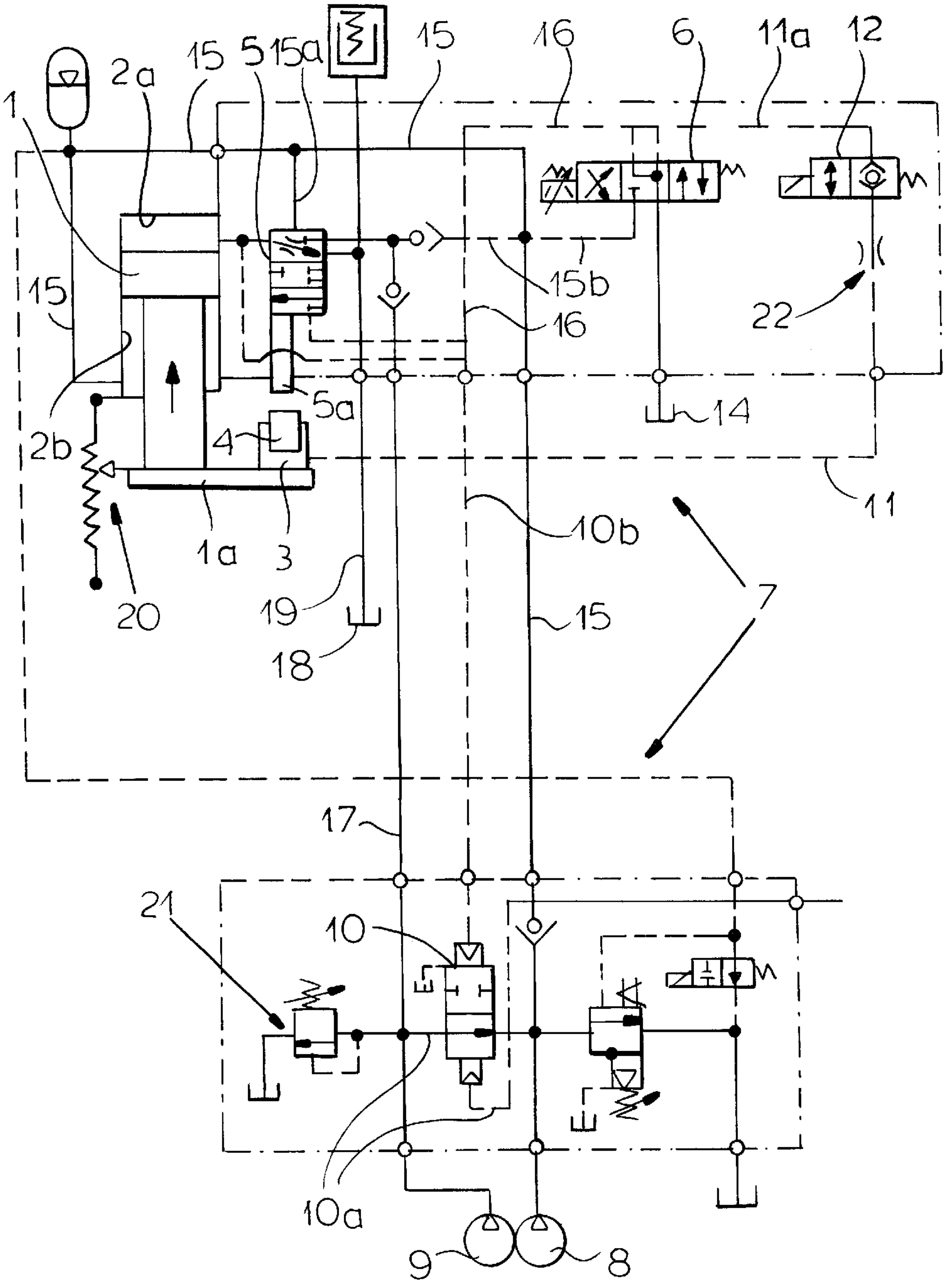
FIG. 2 is a view of the diagram of FIG. 1 in a dynamic stage of the return stroke of the cylinder towards the TDC.

With reference to FIG. 2, it is noted that the plunger of the cylinder 1 is rising and draws with it the beam 1*a*, the chamber 3 and the corresponding setting plunger 4 towards the spool 5*a*, pushed by the pressure that reaches it through the offtake branch 15*a*, connecting to the discharge 18 the upper portion of the chamber 2; the ascent stroke of the plunger of the cylinder 1 stops at the TDC when the plunger 4 makes contact with the spool 5*a* of the copying distributor means 5: in practice, the position of the setting plunger 4 determines the TDC of the cylinder 1.

Figure 3:
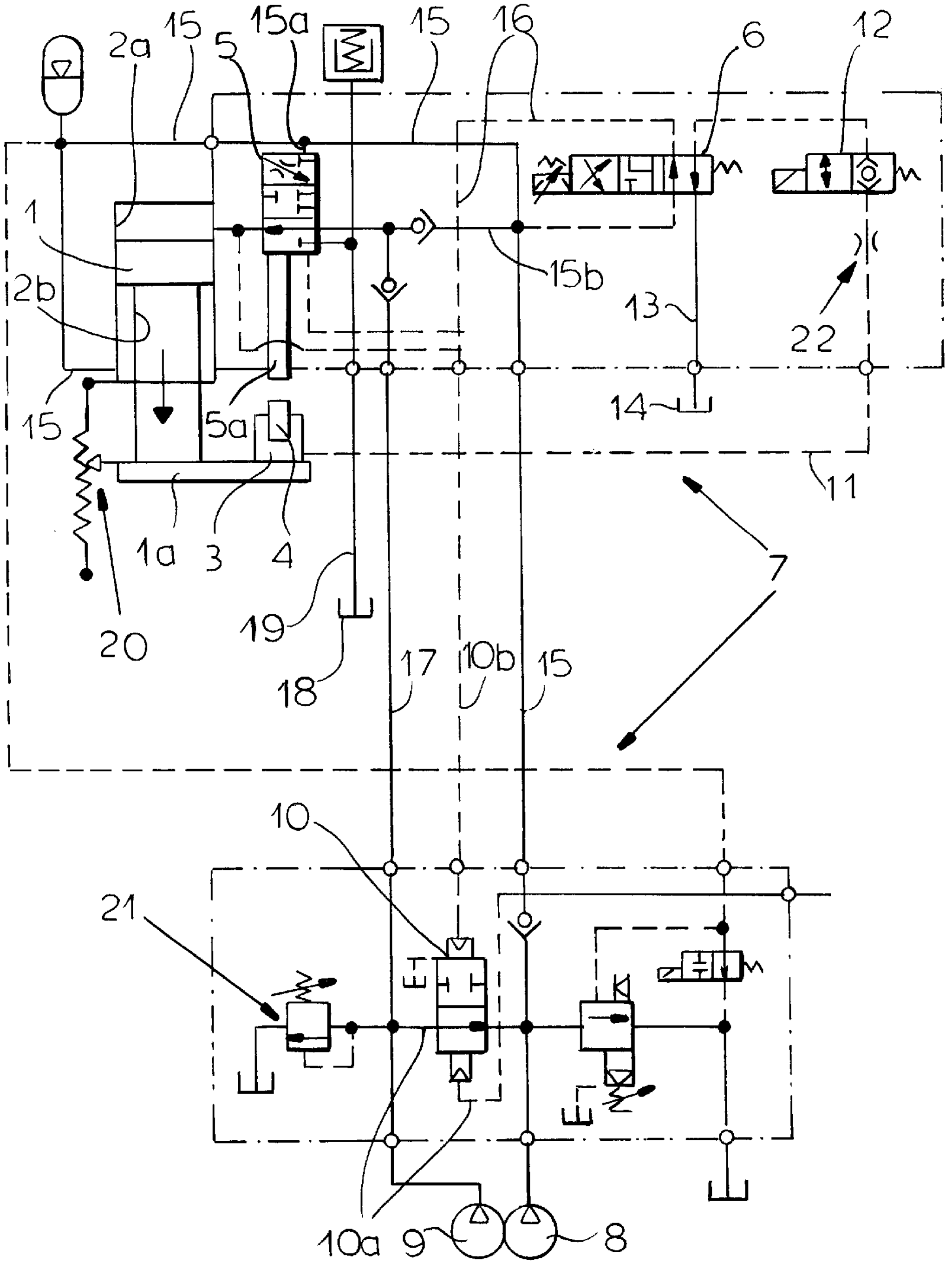
FIG. 3 is another view of the diagram of FIG. 1 in a dynamic stage of the descent of the cylinder towards a metal plate to be machined and the BDC.

During the active step, shown in FIG. 3, it can be noted that the descent of the plunger of the cylinder 1 towards the metal plate to be machined is activated by the movement of the electric valve means 6, in the version with on-off intervention, whose new position, controlled by the operator, who acts on an adapted control, located externally on the corresponding control panel of the punching machine, connects the first pumping means 8 to the lower end of the spool 5*a* of the first copying distributor 5, causing its ascent and the simultaneous connection of the branch 15*b* to the upper portion 2*a* of the chamber 2; the pressure that acts on the entire upper surface of the plunger of the cylinder 1 prevails on the counterpressure that acts constantly on the lower surface thereof, which is choked and has a smaller area, and causes the descent of the plunger of the cylinder 1 for punching.

During this step, the second chamber 3 is inactive, since the second valve means 12 is still in the flow-control configuration and therefore the setting plunger 4 maintains its position, so that in the subsequent step for the return of the plunger of the cylinder 1, described earlier, the plunger of the cylinder reaches its TDC when the stem 5*a* returns to abut against the plunger 4 again.

Figure 4:
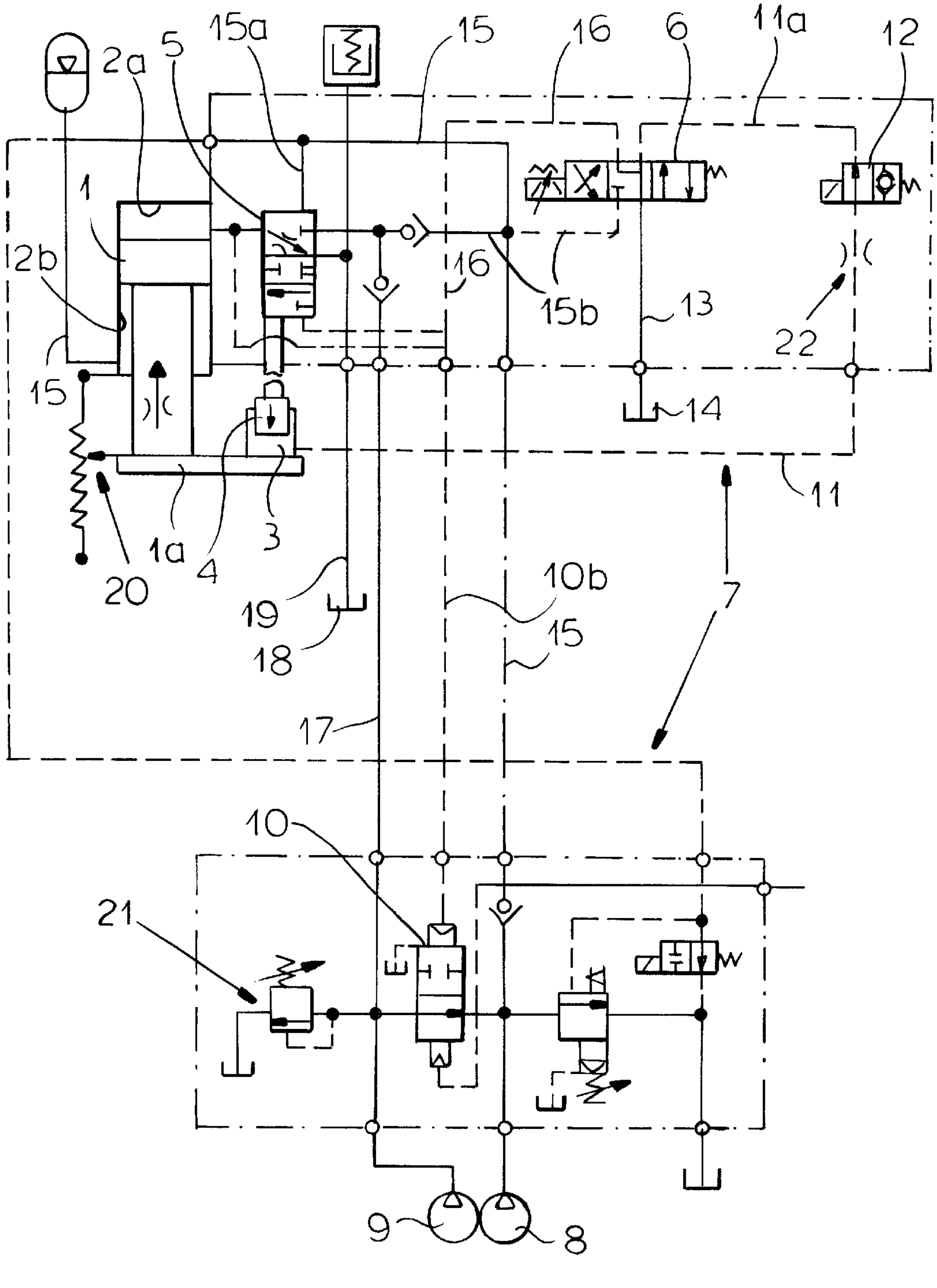
FIG. 4 is another view of the diagram of FIG. 1 in a dynamic stage for the upward adjustment of the TDC of the cylinder.
Figure 5:
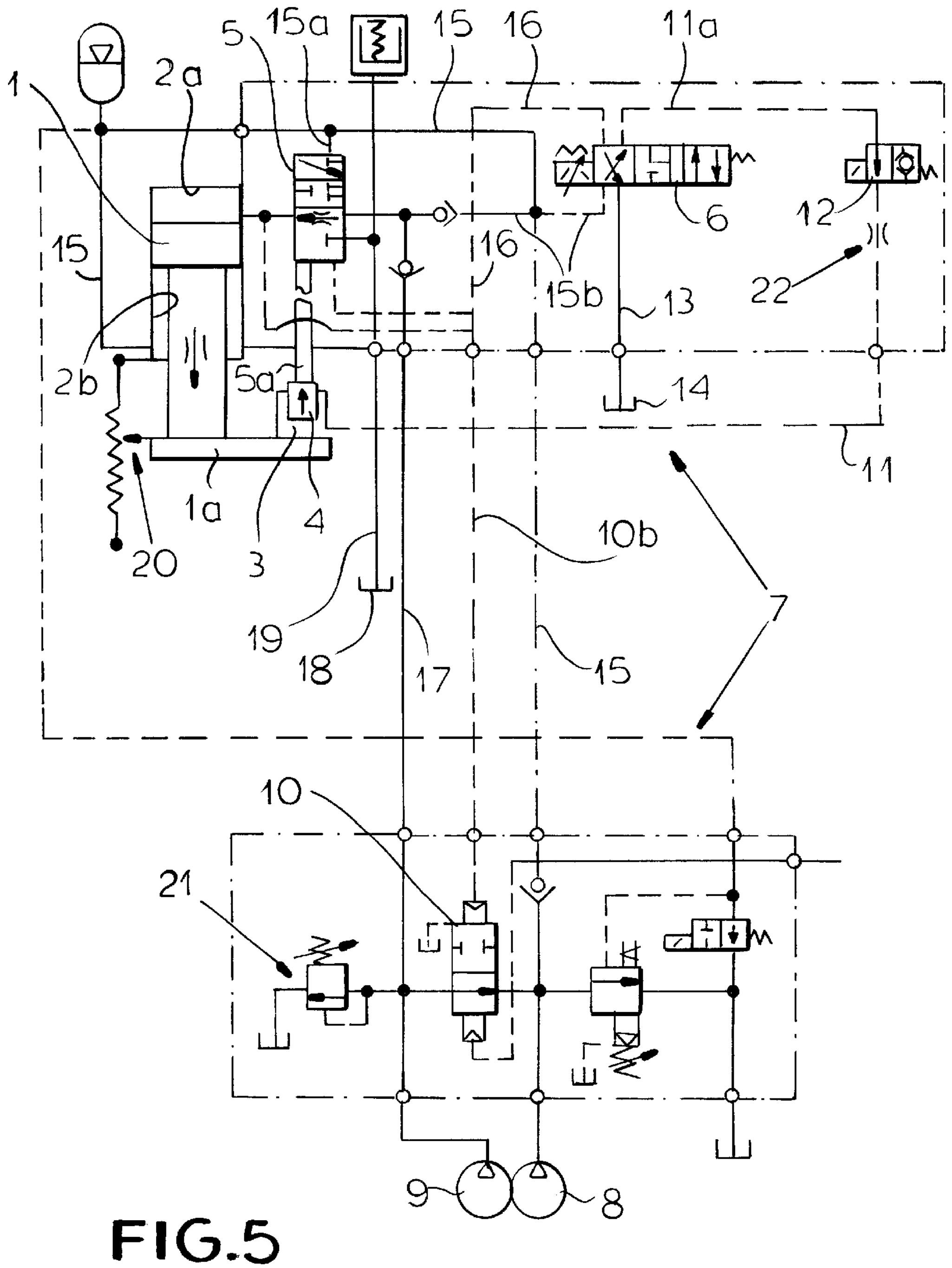
FIG. 5 is another view of the diagram of FIG. 4 during a dynamic stage for the downward adjustment of the TDC of the cylinder.

The subsequent FIGS. 4 and 5 show the circuits 7 during the steps for modifying the position of the TDC of the cylinder 1; this operation is required, for example, when the metal plate to be punched is significantly thick or when the operator has to replace the punch; this operation requires more interspace between said punch and the working surface of the punching machine.

In detail, the position of the setting plunger 4 is changed as follows: if it is necessary to place the TDC of the cylinder

1 at a higher level, the plunger 4 must accordingly be moved downwards with respect to the second chamber 3.

In order to do this, the second valve means 12 arranges itself in an open configuration, directly connecting the branches 11 and 11*a*, and therefore the second chamber 3, to the discharge 14.

At the same time, the spool 5*a* of the first copying distributor means 5 moves downwards, being actuated in an upward region by the pressure that arrives from the first pumping means 8 through the branches 15 and 15*a*, its lower opposite end also being connected to the discharge 14.

This movement opens the connection between the upper portion 2*a* of the chamber 2 and the discharge 18: in this way, the plunger of the cylinder 1 can rise and continuously modify its TDC in an upward direction until the spool 5*a* reaches abutment against the plunger 4.

In order to prevent the variation in TDC from occurring too rapidly, on the branch 11 there is provided, in combination with the use of the electric valve means 6 with on-off intervention, a throttling element 22, usually a jet or a choke having a preset passage section, which slows the outflow of the oil towards the discharge 14 and therefore the movement of the plunger 4 with respect to the second chamber 3.

The opposite occurs when the TDC of the cylinder 1 must be lowered: in this case, see FIG. 5, the second valve means 12 is again in the open configuration and the electric valve means 6 arranges itself in its third possible position, simultaneously connecting the second chamber 3 to the branch 15 that arrives from the first pumping means 8 through the branches 11 and 11*a*.

This causes the upward movement of the plunger 4 with respect to the second chamber 3 and the consequent movement of the first copying distributor means 5, which connects the upper portion 2*b* of the chamber 2 to the branch 15 and therefore to the first pumping means 8.

This produces the movement of the plunger of the cylinder 1 to a lower level, i.e. to its new TDC.

It is noted that the reader means 20 monitors, during the strokes of the plunger of the cylinder 1, both the levels that said cylinder gradually reaches and its BDC, which can be preset in the logic controller of the punching machine.

In particular machinings required of this punching machine, such as for example threading, the cylinder 1 must also be controlled as regards the speed of the active stroke of its plunger towards the metal plate.

In this case, the valve means that is used is the means 6*a*, i.e. of the proportional type, which as is known to the average technician in the field is capable of modulating (see FIG. 6*b*) the delivery of oil towards the second chamber 3; in this way, the plunger 4 actively pushes with a controlled speed the spool 5*a* of the first copying distributor means 5, causing the consequent descent, as above-described, also at a controlled speed, of the plunger of the cylinder 1.

In this condition, the second valve means 12 is in the open configuration and the branch 11 is not provided with the throttling element 22 since it is not necessary, as the valve means 6*a* is in itself capable of modulating, as mentioned, the oil flow-rate.

Finally, with the circuit according to the invention it is also possible to provide so-called scribing, i.e. a rapid and repetitive sequence with a short stroke of the plunger of the cylinder 1 which allows to bite only into the surface of the metal plate.

Figure 7:
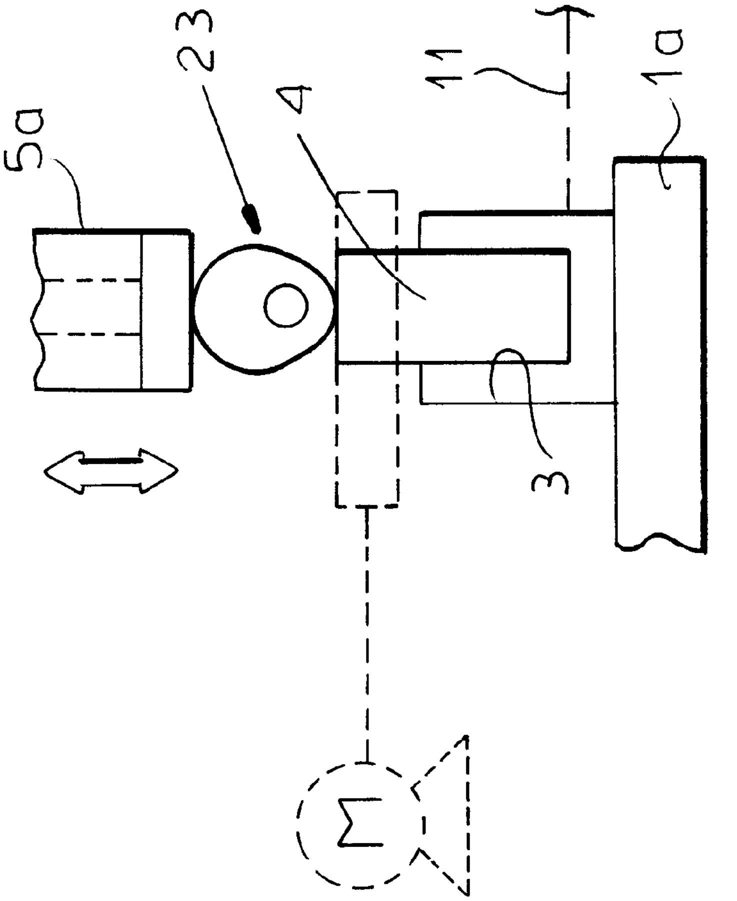
FIG. 7 is a very schematic view of an eccentric means which can optionally be interposed between a means which has micrometric and continuous movement and the spool of said copying distributor means.

This scribing is performed by inserting the eccentric means 23 between the spool 5*a* and the plunger 4, in a defined position thereof in the second chamber 3, as shown schematically in FIG. 7; the rotation of said eccentric means 23 causes the repetitive reciprocating movement of the first copying distributor means 5; accordingly, the cylinder 5 moves repetitively downwards, making the punch bite into the surface of the metal plate, which by being moved on a plane along the axes x and y with a conventional device with which the punching machine is equipped, allows to provide, as mentioned, patterned scribing.

When the plunger of the cylinder 1, during punching, encounters higher resistance by the metal plate, by means of the sensing branch 17 said force, which leads to an increase in pressure inside the upper portion 2*a* of the chamber 2, is transmitted to the second distributor 10.

When said force reaches a threshold value whose intensity can be preset and is substantially equal to 90% of the constant low-pressure value in the specific case, said distributor switches its own position, affecting the branch 10*b*; the second pumping means 9 individually feeds oil to the upper portion 2*a* through the branch 17, providing a pressure increase up to the value of, for example, 250 bar and a consequent significant instantaneous increase in force at the cylinder 1.

As soon as said cylinder has ended its punching action, the second distributor means 10 repositions itself in the normal configuration for low-pressure feeding.

Mechanical setting means, with continuous and micrometric movement can be provided instead of the setting plunger 4. Such mechanical setting means can be constituted, as shown schematically in dotted lines in FIG. 7, by a head for contacting the spool 5*a*, mounted for actuation at an end of a worm screw turned by a corresponding motor unit, or by a contacting element, contacting the spool 5*a*, and mounted at an end of a Bowden cable, also actuated by a corresponding motor unit.

In practice it has been observed that the above-described invention achieves the intended aim.

The invention thus conceived is susceptible of numerous modifications and variations, all of which are within the scope of the inventive concept.

All the details may further be replaced with other technically equivalent ones.

In practice, the materials employed, as well as the shapes and the dimensions, may be any according to requirements without thereby abandoning the scope of the protection of the appended claims.

The disclosures in UK Patent Application No. 0007800.6 from which this application claims priority are incorporated herein by reference.

What is claimed is:

1. A fluid-operated circuit in a punching machine for setting a top dead center location and a bottom dead center location of a punch actuation cylinder having a plunger slidable in a chamber thereof, the circuit comprising:

- a first copying distributor means for distributing pressurized fluid;
- at least one first fast-acting electric valve means for controlling operation of said first copying distributor means;
- a spool located at one end of the first copying distributor means so as to be connectable in output to an upper section of said chamber in which the plunger slides, and in input to said first pumping means and to said at least one first valve means;
- setting means with continuous micrometric movement for setting the stroke of said spool, which is locatable by contact pushing with said setting means, said setting means comprising:
  - a head for contacting said spool,
  - a worm screw means for actuating in movement said head mounted at an end thereof, and a corresponding motor unit for turning said worm screw means.

2. A fluid-operated circuit in a punching machine for setting a top dead center location and a bottom dead center location of a punch actuation cylinder having a plunger slidable in a chamber thereof, the circuit comprising:

a first copying distributor means for distributing pressurized fluid;

at least one first fast-acting electric valve means for controlling operation of said first copying distributor means;

a spool located at one end of the first copying distributor means so as to be connectable in output to an upper section of said chamber in which the plunger slides, and in input to said first pumping means and to said at least one first valve means;

setting means with continuous micrometric movement for setting the stroke of said spool, which is locatable by contact pushing with said setting means, said setting means comprising:

a contacting element for contacting said spool, a cable of the Bowden type having an end thereof connected to said contacting element, and a corresponding motor unit or actuating said Bowden cable.

3. A fluid-operated circuit in a punching machine for setting a top dead center location and a bottom dead center location of a punch actuation cylinder having a plunger slidable in a chamber thereof, the circuit comprising:

a first copying distributor means for distributing pressurized fluid;

at least one first fast-acting electric valve means for controlling operation of said first copying distributor means;

a spool located at one end of the first copying distributor means so as to be connectable in output to an upper section of said chamber in which the plunger slides, and in input to said first pumping means and to said at least one first valve means;

setting means with continuous micrometric movement for setting the stroke of said spool, which is locatable by contact pushing with said setting means;

a second pumping means for pumping fluid at high pressure which is provided in parallel to said first pumping means for pumping fluid at low pressure;

second distributor means for controlling automatic and alternative actuation of said second pumping means, said second distributor means being driven by reaction force acting on said plunger; and an overpressure safety valve means for controlling operation of said second pumping means.

4. The circuit of claim 3, further comprising a parallel connection between said first and second pumping means, said second distributor means being actuatable to interrupt said parallel connection in an active stage of said second pumping means.

5. The circuit of claim 4 wherein said second pumping means is activated in the active stage at a presettable threshold value of said reaction force.

6. A fluid-operated circuit in a punching machine for setting a top dead center location and a bottom dead center location of a punch actuation cylinder having a plunger slidable in a chamber thereof, the circuit comprising:

a first copying distributor means for distributing pressurized fluid;

at least one first fast-acting electric valve means for controlling operation of said first copying distributor means;

a spool located at one end of the first copying distributor means so as to be connectable in output to an upper section of said chamber in which the plunger slides, and in input to said first pumping means and to said at least one first valve means;

setting means with-continuous micrometric movement for setting the stroke of said spool, which is locatable by contact pushing with said setting means; and a reading means for reading and controlling an active stroke extension and a level of the bottom dead center, said reading means being associated with said actuation cylinder and functionally controlling said first electric valve means.

7. A fluid-operated circuit in a punching machine for setting a top dead center location and a bottom dead center location of a punch actuation cylinder having a plunger slidable in a chamber thereof, the circuit comprising:

a first copying distributor means for distributing pressurized fluid;

at least one first fast-acting electric valve means for controlling operation of said first copying distributor means;

a spool located at one end of the first copying distributor means so as to be connectable in output to an upper section of said chamber in which the plunger slides, and in input to said first pumping means and to said at least one first valve means;

setting means with continuous micrometric movement for setting the stroke of said spool, which is locatable by contact pushing with said setting means; and at least one throttling means for throttling a delivery and return flow of pressurized fluid, a second flow control valve means being connectable to said second chamber with interposition of said at least one throttling means.

8. The circuit of claim 7 wherein said first electric valve means is of an on-off intervention type.

9. The circuit of claim 8 wherein said means for throttling the delivery and return of pressurized fluid is associated with said first electric valve means of the on-off intervention type.

10. The circuit of claim 7 wherein said first electric valve means is of a modulated intervention type.

11. A fluid-operated circuit in a punching machine for setting a top dead center location and a bottom dead center location of a punch actuation cylinder having a plunger slidable in a chamber thereof, the circuit comprising:

a distributor valve for controlling flow of pressurized fluid to and from said cylinder and having three positions including a position in which said plunger is displaced by said fluid to said top dead center location, a position in which said plunger is blocked, and a position in which said plunger is displaced into said bottom dead center location;

a spool connected to one end of said valve;

a setting cylinder provided with a piston adapted to act on said spool, and said setting cylinder being coupled with said plunger;

a pump for generating pressurized fluid and connecting to said distributor valve;

a flow control valve connected to said distributor valve for controlled displacement thereof; and a further valve connected to said cylinder for displacing said piston to set positions of said distributor valve, thereby controlling the top dead center location and bottom dead center location.

12. The circuit defined in claim 11, further comprising an eccentric interposed between said spool and said piston.

* * * * *